Nov. 21, 1939.  O. S. FIELD  2,180,583

RELAY

Filed March 23, 1935

INVENTOR
O. S. Field,
BY Neil D. Preston,
his ATTORNEY

Patented Nov. 21, 1939

2,180,583

UNITED STATES PATENT OFFICE 2,180,583

RELAY

Oscar S. Field, Rochester, N. Y., assignor to General Railway Signal Company, Rochester, N. Y.

Application March 23, 1935, Serial No. 12,623

5 Claims. (Cl. 175—337)

This invention relates in general to relays, and more particularly to relays having special operating characteristics adapted to railway signalling use.

In railway signalling systems, a special relay is required in many cases which is termed a retained-neutral polar relay, and this relay is provided with a polar armature responsive to the direction of current in operating windings, a neutral armature responsive to the presence or absence of current of either direction in the same operating windings and a retaining armature acting to hold the neutral armature in its attracted position during a change in the direction of current in the operating windings. The retaining armature in a relay of this type is operated by a separate magnetic structure having windings energized by current induced in a secondary winding on the same magnetic structure as the operating windings during a change in flux in this magnetic structure.

The magnetic force acting on the retaining armature in such an arrangement is small as compared to the force biasing the neutral armature toward its de-energized position, and as the magnetic force acting on the retaining armature is required to hold the neutral armature in its attracted position, it is necessary to give the force exerted by the retained armature a greater mechanical advantage than the force biasing the neutral armature. The means for providing this difference in mechanical advantages has taken the form of a rigid non-magnetic arm connecting the neutral armature with the retaining armature, such as in Patent No. 1,969,055 granted on August 7, 1934, to J. E. Willing, and as such arm extends on the same side of the pivotal axis as the neutral armature, the retaining arm obviously acts through a considerably greater moment arm than the neutral armature, whereby the magnetic torque effected by the retaining armature on the neutral armature can be arranged to exceed that of the gravity bias.

However in certain applications of the retained-neutral polar relay of this construction, such as a normally energized railway track circuit, it is found that the flux decay in the main magnetic structure is so slow that insufficient current is induced in the secondary winding to retain the neutral armature regardless of the mechanical advantage granted to the retaining armature force by the rigid extension connecting the neutral and the retaining armatures. It is contemplated that this deficiency is due to the fact that the increased moment arm given to the retaining armature also increases the biasing force of the neutral armature due to the weight of the retaining armature acting on the neutral armature through this increased moment arm, thereby substantially counteracting the added retaining torque.

A means for providing both slow pick-up and slow-release characteristics of a relay of the retained-neutral polar type is disclosed in the above referred to Patent No. 1,969,055 by the provision of both upper and lower pole pieces coacting with the retaining armature, but it is found that the rigid arm connecting the neutral armature with the retaining armature is also inadequate under certain conditions to enable the retaining armature to effectively delay the response of the neutral armature.

In view of the above and other considerations, it is proposed in accordance with the present invention to provide a retained-neutral polar relay wherein the relatively small magnetic force obtaining in the retaining armature is multiplied and transmitted to the neutral armature in a manner to effectively control either the release or the attraction of the neutral armature. More specifically, it is proposed to provide a force multiplying lever arm operably connecting the retaining armature with the neutral armature whereby the magnetic force obtaining in the retaining armature acts on the neutral armature through a much greater moment arm than the neutral armature biasing force, but wherein the retaining magnetic structure can be located closer to the operating magnetic structure to thereby reduce the dimensions of the relay. It is further proposed to provide a neutral armature retaining means wherein the weight of the retaining armature is not transmitted to the neutral armature through the medium of the force-multiplying lever thus provided, and consequently the load or the force biasing the neutral armature toward its de-energized position is not increased by the means for increasing the effectiveness of the magnetic force of the retaining armature on the neutral armature.

Other objects of the present invention include the provision of a retained-neutral polar relay wherein certain elements altering the operating characteristics are arranged for convenient adjustment and wherein the various elements are of a simple and rugged construction with the friction of moving parts reduced to a minimum to obtain the advantages of high efficiency and reliability of operation.

Other objects, purposes and characteristic features of the present invention will become apparent as the description thereof progresses, during which references will be made to the accompanying drawing, in which.

In the accompanying drawing, the parts of a retained-neutral polar relay which are necessary for an understanding of the present invention have been shown more in detail than certain other parts which may be of the usual construction and arrangement which is now well known. For example, the polar armature and its coacting portion of the magnetic circuit has been omitted together with certain other details such as contacts, binding posts, etc., but the relation of these parts to the illustrated embodiment of the present invention may be clearly understood when considered in connection with the neutral polar relay shown in Patent No. 1,749,331 granted on March 4, 1930, to O. S. Field, to which general construction the present invention is applied.

Figure 2:
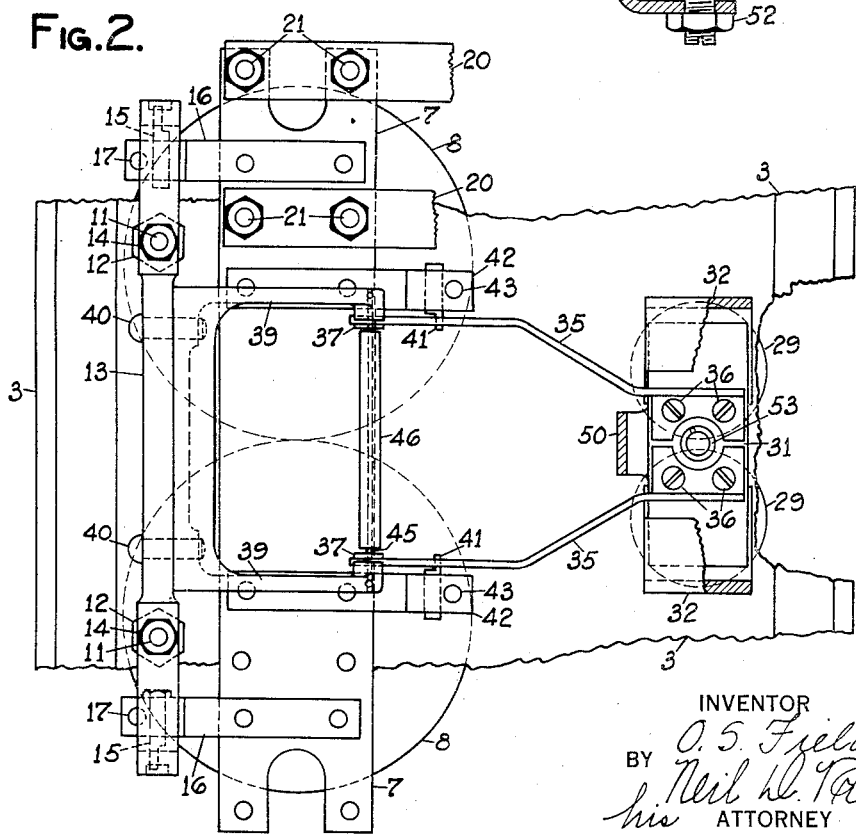
Fig. 2 is a bottom view of the relay shown in Fig. 1 also having parts removed and other parts broken away.

In the illustrated arrangement of the present relay, the various elements thereof are mounted upon an insulating top plate 3 of Bakelite or a similar material. The magnetic structure illustrated comprises two parallel magnetic cores 4, each carrying an operating winding 8 as shown in Fig. 2, which cores 4 are magnetically joined at their upper ends by bars 5 while the lower ends extend through the top plate 3 and terminate in enlarged pole pieces 6. It is understood that in the complete retained-neutral polar relay construction, the magnetic structure thus provided is polarized by a center permanently magnetized core (not shown) extending parallel with the cores 4 and magnetically joined to the cross bars 5. The lower end of this omitted core carries a pole piece magnetically coupled to a polar responsive armature which cooperates with the two pole pieces 6 in a manner to respond distinctively to the direction of current in the windings 8, all as disclosed in the above referred to Patent No. 1,749,331.

The top plate 3 carries two downwardly extending bolts 11 fixed thereto by nuts 12, and a cross bar 13 is adjustably positioned vertically upon the body portion of the bolts 11 between clamping nuts 14. The ends of the cross bar 13 extend upwardly and are provided with bearing holes receiving reduced ends of trunnion pins 15 which are adjustably clamped within ends of arms 16 by screws 17. The arms 16 are riveted to a neutral magnetic armature 7 which cooperates with the two pole pieces 6, whereby it is obvious that the armature 7 is operable about its pivotal axis provided by the trunnion pins 15 toward the pole pieces 6 to its position illustrated in Fig. 1 in response to the flow of current in windings 8, and is biased by gravity to a lower position away from these pole pieces 6.

Suitable contact fingers are operated by the neutral armature such as the two fingers 20, which are partially shown in Fig. 2, as mounted on the armature 7 by insulating screws 21, and it is obvious that two additional contact fingers may be mounted in a similar manner on the other end of armature 7. These contact fingers 20 of course cooperate with associated upper and lower fixed contacts, which for simplicity have been omitted from the present drawing.

Figure 1:
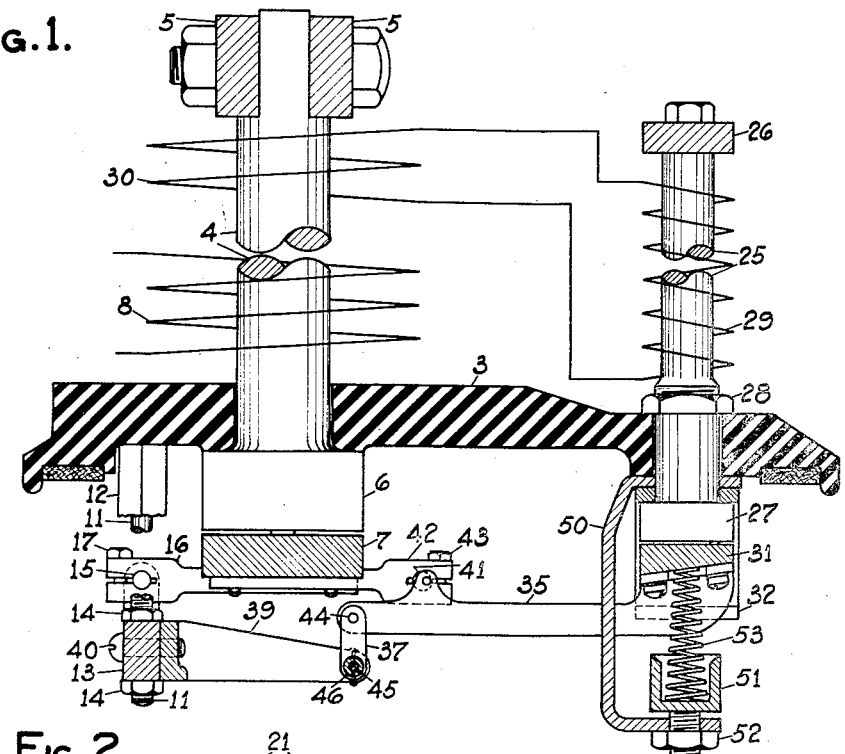
Fig. 1 is a sectional side elevational view of a relay constructed in accordance with the present invention with certain parts removed to more clearly show the arrangement of parts embodying the present invention.

In a retained-neutral polar relay such as partially shown in Fig. 1, it will be clear that when the direction of current in the operating windings 8 is reversed to change the position of the polar responsive armature, the flux in the main magnetic structure or through the cores 4 must pass through a zero value and consequently the armature 7 is momentarily released by this main magnetic structure.

The illustrated means for retaining the neutral armature in its attracted position during such a reversal of current comprises a separate retaining magnetic structure formed by two parallel vertical cores 25 magnetically joined at their upper ends by a cross bar 26, while their lower ends terminate in enlarged pole pieces 27 clamped to the lower side of the top plate 3 by nuts 28. The cores 25 carry windings 29 which are suitably connected to secondary windings 30 arranged on the main magnetic structure which carries the operating windings 8.

A magnetic armature 31 coacts with the pole pieces 27 of the retaining magnetic structure, whereby it is clear that any change in flux value in the main magnetic structure induces a current in the secondary windings 30 which is conducted to the retaining windings 29 to effect the attraction of armature 31 toward the pole pieces 27. It may be mentioned here that although the single winding 29 in Fig. 1 is illustrated as directly connected to the single secondary winding 30 it is the usual practice to arrange the two secondary windings 30 in multiple and the two retaining windings 29 in series.

The means for mechanically connecting the retaining armature 31 with the neutral armature 7 in accordance with the present invention comprises two non-magnetic lever arms 35 attached at their front ends to the retaining armature 31 such as by screws 36, while the rear ends of these arms 35 are pivotally attached by respective fulcrum links 37 to forwardly extending arms of a stationary U-shaped bracket 39 attached to the cross bar 13 by screws 40. The upper ends of the fulcrum links 37 are attached to the rear ends of the respective arms 35 by pivot pins 44 while the lower ends are attached to the bracket 39 by a pivot cross pin 45 carrying a spacing sleeve 46.

A bearing hole is located in each of the lever arms 35 at a point considerably nearer the fulcrum links 37 than the armature 31, which bearing hole receives reduced ends of trunnion pins 41 adjustably clamped in arms 42 by screws 43, the arms 42 being riveted to the armature 7. It is clear that this arrangement of the lever arms 35 transmits the force retaining the armature 31 against the pole pieces 27 through a combination of multiplying levers in a manner to allow the slight upward force acting on the armature 31 to produce a torque which overcomes the considerably greater gravity biasing torque acting downwardly on the armature 7.

In order to delay the operation of the neutral armature 7 from its de-energized position in response to the application of current to windings 8, the retaining magnetic structure is provided with magnetic extensions 32 which are clamped between the pole pieces 27 and the top plate 3 and extend downwardly around the respective ends of the armature 31 to present lower pole pieces engageable by the lower side of the retaining armature 31 when both the neutral armature and the retaining armature are in their released position. The increasing value of flux in the main magnetic structure caused by the application of current to windings 8 then induces a current in the secondary windings 30 which is conducted to the retaining windings 29 thereby magnetically retaining the armature 31 against the lower pole pieces 32 until the flux in the main magnetic structure has reached a constant value.

This rather slight magnetic retaining force acting on armature 31 is also transmitted to the neutral armature 7 through the multiplying lever arm arrangement thereby producing sufficient torque to overcome the upward magnetic torque acting on armature 7 thereby delaying the response of the armature 7 until the increasing flux in the main magnetic circuit reaches a constant value.

A means for preventing the weight of the retaining armature 31 from unduly adding to the bias of the neutral armature 7 is herein provided by a non-magnetic bracket 50 having its upper end clamped between the retaining pole pieces 27 and the top plate 3. A downwardly extending portion of the bracket 50 is bent forwardly to carry a cup-shaped screw 51 threaded therein and locked in position by a nut 52. A compression spring 53 rests in the cup-shaped head of screw 51 so that its upper end engages the lower side of the retaining armature 31, and the tension of spring 53 is adjusted by the cup-shaped screw 51 to exert an upward pressure on armature 31 which counter-balances all or a major part of its weight.

A retained-neutral polar relay has thus been provided in which the mechanical advantage possessed by the retaining magnetic force over that of the biasing force of the neutral armature enables the neutral armature to be reliably retained during a reversal of current in the operating windings and similarly enables the response of the neutral armature to be effectively delayed upon de-energization of the operating winding. In a very similar manner the holddown magnetic force developed in the retaining magnetic arrangement is multiplied to effectively delay the attraction of the neutral armature from its de-energized position upon energization of the operating windings.

One important feature of the present invention is the provision of a means for multiplying the force of the retaining armature which does not increase the dimensions of the usual neutral-polar relay. In other words the articulated construction of the force-multiplying lever arm provides a greater effective moment arm for the magnetic force of the retaining armature but allows the retaining magnetic structure to be placed considerably closer to the main magnetic structure than would be permitted by a rigid connection between the neutral and retaining armature which would provide the same force multiplying ratio.

Another important feature is the provision of means counter-balancing the weight of the armature whereby the operating load on the neutral armature is not unduly increased by the weight of the retaining armature multiplied through the force-multiplying lever arm. In the present disclosure, this weight counter-balancing means is made adjustable so that under some conditions, a counter-balancing force slightly less than the weight of the retaining armature may be provided to increase the load on the neutral armature, while under other conditions, a force slightly greater than the weight of the retaining armature may be provided to relieve the load ordinarily imposed by the weight of the neutral armature.

The above rather specific description of one form of the present invention is given solely by the way of example, and is not intended, in any manner whatsoever, in a limiting sense. It is also to be understood that various modifications, adaptations and alterations may be applied to meet the requirements of practice, without in any manner departing from the spirit or scope of the present invention, except as limited by the appended claims.

What I claim is:

1. In a relay, a main armature, an operating winding for the main armature, a retaining magnetic structure having upper and lower pole pieces, a retaining winding energizing the upper and lower pole pieces during a change of current in the operating windings, a retaining armature statically balanced between the upper and lower pole pieces of the retaining magnetic structure, and articulated lever means interconnecting the main armature and the retaining armature and granting a mechanical advantage to the retaining armature over the main armature.

2. In a relay, a neutral armature, an operating winding for the neutral armature, a retaining armature, an operating winding for the retaining armature, means inductively relating the said windings, a first arm extending in one direction from the neutral armature, a second arm extending in the opposite direction from the neutral armature, a fixed member pivotally carrying the extending end of the first arm, a third arm extending from the retaining armature, a pivot connecting the extending end of the third arm to the fixed member, and a pivot pin positively interconnecting the extending end of the second arm to an intermediate portion of the third arm.

3. In a relay, a main armature, an operating winding for the main armature, a retaining armature spaced from the main armature, an operating winding for the retaining armature so connected as to be energized during, and due to, flux changes in the main armature winding, an arm carrying the main armature and extending to opposite sides thereof, a pivot for the end of the arm at the side of the main armature away from the retaining armature, a lever carrying at one end the retaining armature and extending toward the main armature, said lever being pivotally supported at its other end on a fixed support, and means pivotally interconnecting an intermediate point on the retaining armature lever to the other end of the main armature arm.

4. In a relay, a main armature and spaced therefrom a retaining armature, a main winding and a retaining winding for said armatures, respectively, means energizing the retaining winding actuated by a change of current in the main winding, a retaining armature arm pivotally fixed at one end and carrying the retaining armature at the other end, and a main armature arm carrying the main armature and pivotally fixed at one end and positively pivotally attached at the other end to an intermediate portion of the retaining armature arm whereby the main armature arm and the retaining armature arm must always move together.

5. In a relay having a main armature and spaced therefrom a retaining armature, an operating winding for each of said armatures, respectively, and circuit means causing energization of the retaining armature winding to be dependent upon a current change in the main armature winding, a retaining armature arm extending toward the main armature and pivotally fixed at one end and carrying the retaining armature at the other end, a main armature arm carrying the main armature and extending parallel with, and in overlapping relation to, the retaining arm and pivotally fixed at one end and positively pivotally attached at the other end to an intermediate portion of the retaining armature arm, whereby to economize in space between the two armatures, and an adjustable compression spring arranged to neutralize various portions of the gravitational load on the main armature arm.

OSCAR S. FIELD.